United States Patent [19]

Kodera et al.

[11] Patent Number: 5,406,397
[45] Date of Patent: Apr. 11, 1995

[54] RUBBING APPARATUS, APPARATUS FOR PRODUCING LIQUID CRYSTAL DEVICE AND METHOD FOR PRODUCING LIQUID CRYSTAL DEVICE

[75] Inventors: Yasuto Kodera, Fujisawa; Kimio Takahashi, Machida; Yoshio Hotta, Atsugi, all of Japan

[73] Assignee: Canon Kabushiki Kaisha, Tokyo, Japan

[21] Appl. No.: 170,777

[22] Filed: Dec. 21, 1993

[30] Foreign Application Priority Data

Dec. 26, 1992 [JP] Japan .................. 4-359308

[51] Int. Cl.6 .......................................... G02F 1/1337
[52] U.S. Cl. ............................................. 359/76
[58] Field of Search ................................ 359/76

[56] References Cited

U.S. PATENT DOCUMENTS 5,315,421 5/1994 Kurai et al. ................. 359/76

FOREIGN PATENT DOCUMENTS

| 124320 | 7/1984 | Japan . |
| 172323 | 7/1987 | Japan . |
| 254417 | 10/1990 | Japan . |
| 131822 | 6/1991 | Japan . |
| 3156424 | 7/1991 | Japan . |
| 5142542 | 6/1993 | Japan . |

Primary Examiner—Kenneth J. Ramsey
Attorney, Agent, or Firm—Fitzpatrick, Cella, Harper & Scinto

[57] ABSTRACT

A rubbing apparatus for imparting an alignment control power with respect to alignment of liquid crystal molecules to an alignment film on a transparent substrate of a liquid crystal device by rubbing the alignment film with a rubbing roller while the rubbing roller is rotated and kept in contact with the transparent substrate having thereon the alignment film, comprising: measuring means for measuring a three-dimensional stress imposed on the transparent substrate by the rubbing roller when the rubbing roller is brought into contact with the transparent substrate, and control means for controlling the three-dimensional stress so as to provide a prescribed stress to effect a rubbing treatment. The measuring means may perform the measurement by breaking up a stress into two stress components in directions perpendicular and parallel to the rubbing direction, respectively. The measurement of a stress may be performed by measuring a load imposed on the transparent substrate. The rubbing apparatus may further comprise judging means for judging a fluctuation in stress and correction means for correcting the fluctuation.

5 Claims, 3 Drawing Sheets

RUBBING APPARATUS, APPARATUS FOR PRODUCING LIQUID CRYSTAL DEVICE AND METHOD FOR PRODUCING LIQUID CRYSTAL DEVICE

FIELD OF THE INVENTION AND RELATED ART

The present invention relates to a rubbing apparatus for imparting an alignment control power to an alignment control film for aligning liquid crystal molecules, in a liquid crystal device, an apparatus for producing the liquid crystal device, and a method for producing the liquid crystal device. More specifically, the present invention relates to a rubbing apparatus for uniformly and stably imparting an alignment control power with good reproducibility to an alignment control film for aligning liquid crystal molecules in a liquid crystal device, an apparatus for producing the liquid crystal device, and a method for producing the liquid crystal device.

A ferroelectric liquid crystal device is constituted by disposing a ferroelectric liquid crystal between a pair of substrates each having thereon a transparent electrode and an alignment film (or alignment control film) directly contacting the liquid crystal to control the alignment of the liquid crystal molecules.

Figure 4:
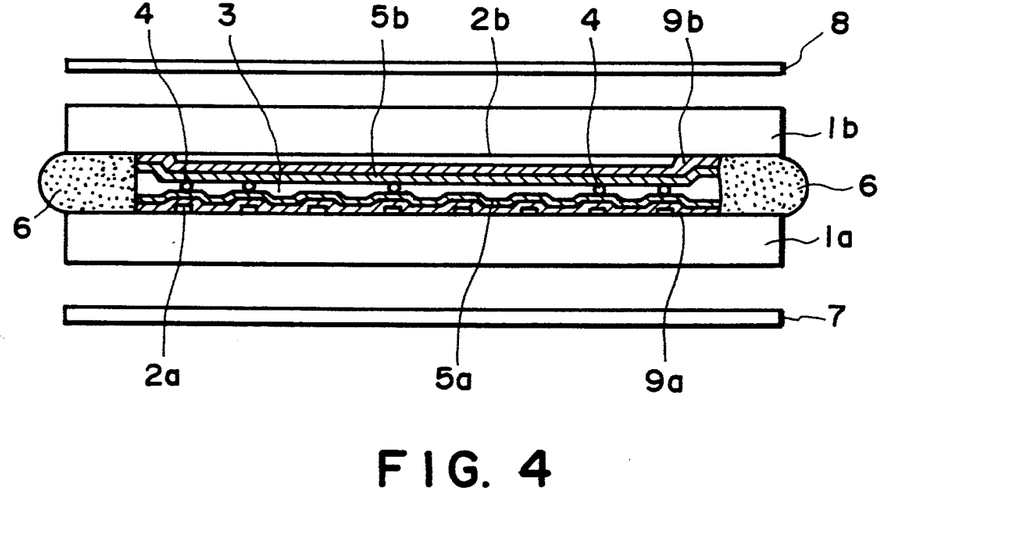
FIG. 4 is a schematic view of a conventional liquid crystal device.

FIG. 4 illustrates a sectional structure of an example of such a liquid crystal device.

Referring to FIG. 4, the liquid crystal device has a cell structure including transparent glass substrates 1a and 1b disposed opposite to each other with a prescribed gap therebetween set by spacers 4, and an adhesive 6 sealing the periphery of the substrates 1a and 1b. On the substrate 1 is further formed an electrode groups (e.g., an electrode group for applying a scanning voltage of a matrix electrode group) comprising a plurality of transparent electrodes 2a in a prescribed pattern of, e.g., stripes. On the substrate 1b is formed another electrode group (e.g., an electrode group for applying signal voltages of the matrix electrode structure) comprising a plurality of transparent electrodes 2b intersecting the above-mentioned transparent electrodes 2a. A liquid crystal 3 is disposed between the substrates 1a and 1b. Such a cell structure is disposed between a pair of polarizers 7 and 8 to form a liquid crystal display apparatus.

The electrodes 2a and electrodes 2b are respectively covered with insulating films 9a and 9b, respectively, for preventing short circuit, on which are further disposed alignment control films 5a and 5b. The alignment control films 5a and 5b may be formed as inorganic insulating films or organic insulating films subjected to a surface-aligning treatment.

Figure 5:
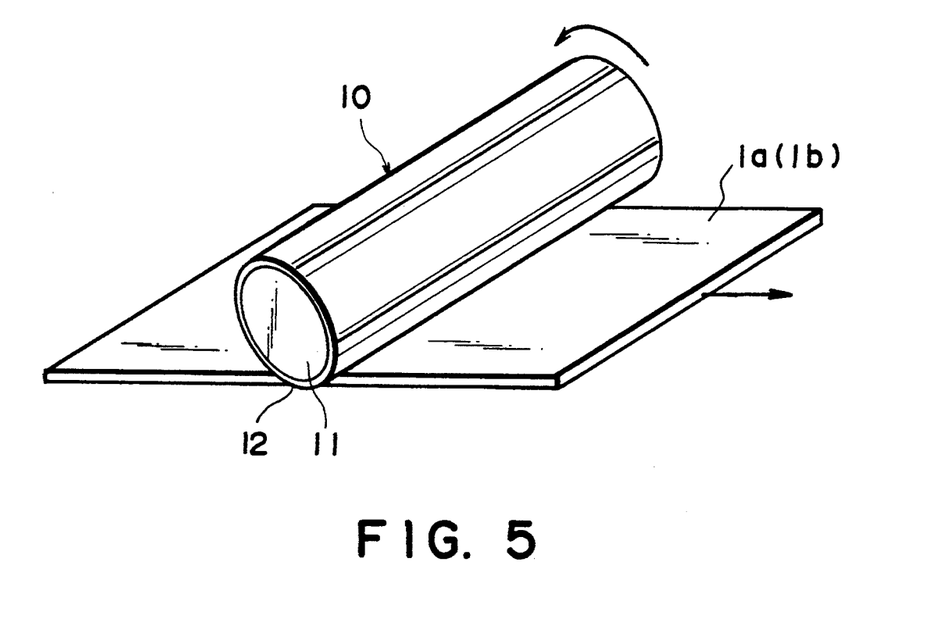
FIG. 5 is a schematic perspective view for illustrating a conventional rubbing apparatus and rubbing method.
Figure 6:
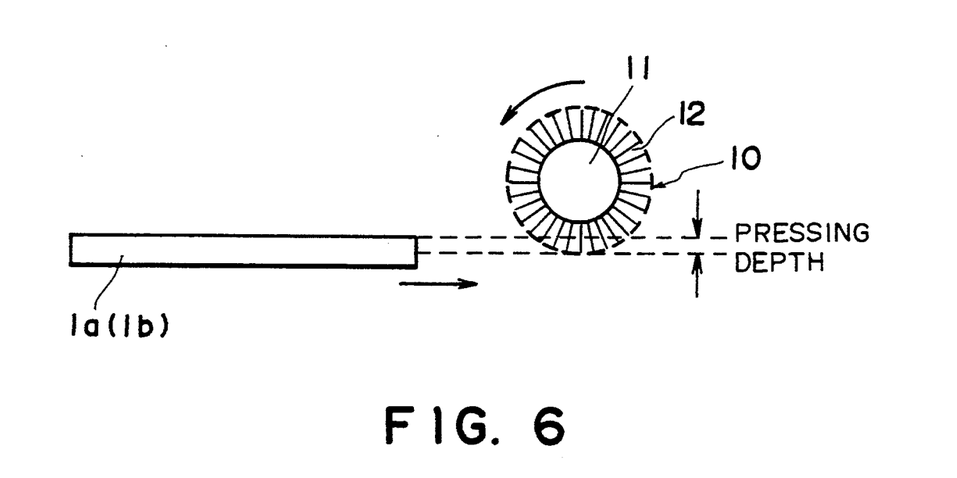
FIG. 6 is a schematic sectional view illustrating a conventional rubbing apparatus and rubbing method.

Hitherto, the rubbing method has generally been practiced as a method of aligning treatment for providing such an alignment control films. In the rubbing method, an alignment film is rubbed in one direction with a cloth planted with pile yarn so as to align liquid crystal molecules contacting the alignment film in the rubbed direction. It is necessary that the rubbing is applied uniformly to the entire area of the alignment film formed on a transparent substrate (hereinbelow, abbreviated as "substrate"). In view of the productivity, the rubbing is generally performed by using a rubbing apparatus as shown in FIG. 5 or 6. Referring to FIGS. 5 and 6, a rubbing cloth 12 is wound about a cylindrical roller 11 to constitute a rubbing roller 10 and pile yarn planted onto the rubbing cloth 12 caused to contact or abut a substrate 1a (or 1b) under a prescribed pressing force. At this time, a degree of pressing or pressing depth of the rubbing roller 10 against the substrate 1a or 1b is controlled by moving the rubbing roller upward or downward in a direction perpendicular to the substrate force as show in FIG. 6. In such a state that the rubbing roller 10 is thrown into contact with or pressed against the substrate 1a or 1b at a certain pressing depth by the above method, the rubbing roller 10 is rotated simultaneously with movement of the substrate or the rubbing roller in horizontal direction, thus performing aligning treatment to the entire area of the substrate.

In order to constantly impart a uniform alignment control power the entire area of the substrate in the above case, it is severely required to regulate conditions of the rubbing treatment including: the pressing depth, the rotational speed (number of rotation per unit time) of the rubbing roller, and the moving velocity (feed speed) of a stage (on which the substrate is mounted) or the rubbing roller. Among the above condition of the rubbing treatment, the rotational speed and the moving velocity can readily be regulated in view of accuracy of the rubbing apparatus. With respect to the pressing depth, there have been practiced a method of adjusting a pressing depth according to visual measurement and a method wherein an average thickness of a rubbing cloth is measured in advance and a pressing depth is determined by the thickness of the rubbing cloth and a diameter (or radius) of a rubbing roller.

However, the former is liable to cause a difference in pressing depth depending on an observer and the latter frequently causes variations in a thickness of a rubbing cloth to be used, thus failing to impart a uniform alignment control power. Particularly, in a ferroelectric liquid crystal device, an impartation of such a uniform alignment control power is an important technical problem because, e.g., an alignment state of the liquid crystal and driving characteristics of the liquid crystal device are sensitively affected by an imparted alignment control power.

SUMMARY OF THE INVENTION

In view of the above-mentioned problems, an object of the present invention is to provide a rubbing apparatus capable of imparting a uniform alignment power to an alignment film even when the alignment film is formed on a large-area glass substrate, an apparatus for producing a liquid crystal device having such a alignment film, and a method for producing such a liquid crystal device.

According to the present invention, there is provided a rubbing apparatus for imparting an alignment control power with respect to alignment of liquid crystal molecules to an alignment film on a transparent substrate of a liquid crystal device by rubbing the alignment film with a rubbing roller while the rubbing roller is rotated and kept in contact with the transparent substrate having thereon the alignment film, comprising:

measuring means for measuring a three-dimensional stress imposed On the transparent substrate by the rubbing roller when the rubbing roller is brought into contact with the transparent substrate, and control means for controlling said three-dimensional stress so as to provide a prescribed stress to effect a rubbing treatment.

According to the present invention, there is also provided an apparatus for producing a liquid crystal device of the type including a liquid crystal disposed between a pair of transparent substrates, at least one of the transparent substrates being provided with an alignment film, comprising:

load-measuring means for measuring a three-dimensional load corresponding to a three-dimensional stress imposed on the transparent substrate provided with the alignment film by a rubbing roller in the step of rubbing the alignment film with the rubbing roller while the rubbing roller is rotated and kept in contact with the alignment film thereby to impart an alignment control power with respect to alignment of liquid crystal molecules to the alignment film, and control means for controlling said three-dimensional stress so as to provide a prescribed three-dimensional load.

According to the present invention, there is further provided a process for producing a liquid crystal device of the type including a liquid crystal disposed between a pair of transparent substrates, at least one of the transparent substrates being provided with an alignment film, comprising:

measuring a three-dimensional load corresponding to a three-dimensional stress imposed on the transparent substrate provided with the alignment film by a rubbing roller in the step of rubbing the alignment film with the rubbing roller while the rubbing roller is rotated and kept in contact with the alignment film thereby to impart an alignment control power with respect to alignment of liquid crystal molecules to the alignment film, and controlling said three-dimensional stress based on a measured three-dimensional load to impart a uniform alignment control power to the alignment film.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Figure 1:
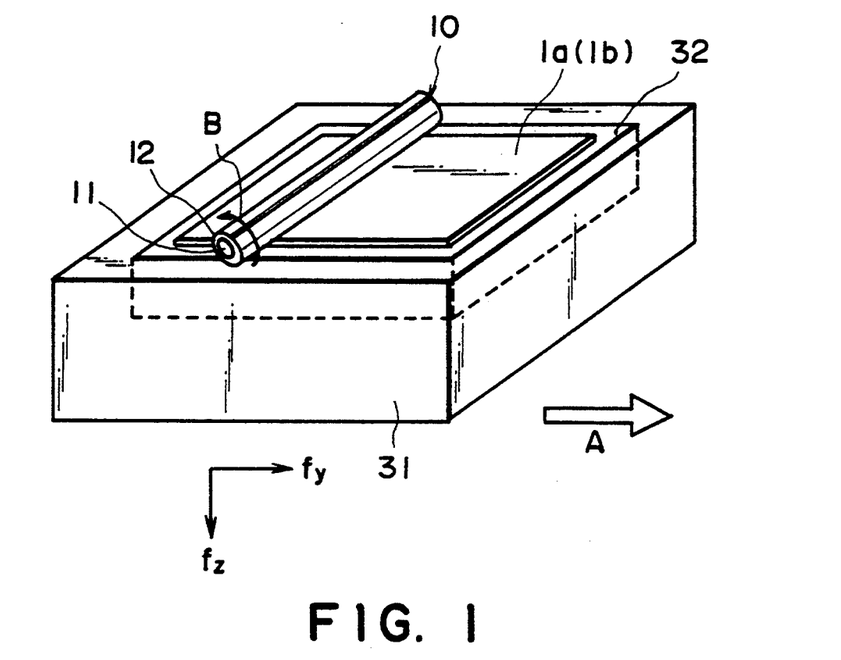
FIG. 1 is a schematic perspective view for illustrating an embodiment of the rubbing apparatus according to the present invention.

FIG. 1 is an embodiment of the rubbing apparatus according to the present invention. The rubbing apparatus is used in Example 1 appearing hereinafter. Referring to FIG. 1, the rubbing treatment is performed by rotating a rubbing roller 10, comprising a cylindrical roller 11 and a rubbing cloth 11 having pile yarn wounded about the roller 11, in the direction of an arrow B while pressing the rubbing roller 10 against a glass substrate 1a or 1b provided with an alignment film at a prescribed pressing depth, and further by moving a stage 31 in the direction of an arrow A. At this time, on the stage 31, means for measuring a load 32 such as an piezoelectric element and the glass substrate 1a or 1b are successively mounted. The load-measuring means 32 is used for three-dimensionally measuring a load (including a load component fy in horizontal direction (i.e., a direction parallel to the moving direction of the stage 31) and a load component fz in vertical direction (i.e., a direction perpendicular to the substrate face)) corresponding to a three-dimensional stress imposed on the substrate 1a or 1b by the rubbing roller 10.

Figure 2:
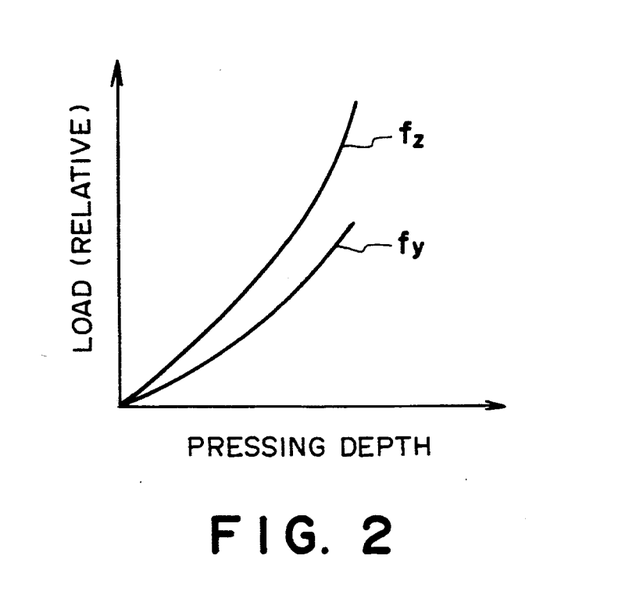
FIG. 2 is a graph showing a relationship between pressing depth of a rubbing roller against a glass substrate and stress components fy and fz imposed on a glass substrate by the rubbing roller.

In the above rubbing apparatus, as shown in FIG. 2, the load components fz and fy are proportional to the pressing depth of the rubbing roller 10, respectively. Accordingly, if a relationship between the load component fz and the pressing depth and a relationship between the load component fy and the pressing depth are determined previously with respect to a rubbing roller to be used, it is possible to control a pressing force by monitoring the load components fz and fy, thus uniformly imparting a constant alignment control power to an alignment film formed on the glass substrate 1a or 1b. In this embodiment, the load-measuring means 32 may be disposed at a position on which the rubbing roller 10 is moved. Further, the rubbing roller 10 may be rotated in a direction opposite to the arrow B direction. At this time, the load component fz is imposed in a direction opposite to that shown in FIG. 1. The rubbing roller 10 may also be moved in the arrow A direction during the rubbing while the stage 31 is fixed.

Figure 3:
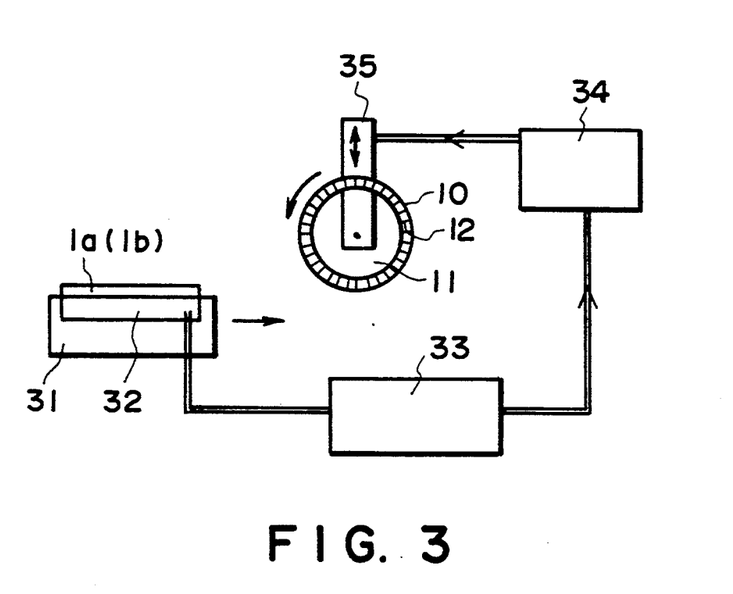
FIG. 3 is a schematic sectional view for illustrating another embodiment of the rubbing apparatus and the operation principle thereof according to the present invention.

FIG. 3 is another embodiment of the rubbing apparatus according to the present invention. The rubbing apparatus is used in Example 2 appearing hereinafter. Referring to FIG. 3, reference numerals 1a, 1b, 10, 11, 12, 31 and 32 mean the same members as in FIG. 1, respectively.

The rubbing apparatus as shown in FIG. 1 described above can control a pressing force so as to have a prescribed load by three-dimensionally measuring the load imposed on the glass substrate 1a or 1b immediately before the rubbing treatment. Such a rubbing apparatus, however, lacks a correction means for the pressing force when the pressing force is changed for some reason during the rubbing treatment.

Referring again to FIG. 3, the rubbing apparatus has a feedback control system comprising an arithmetical unit 33 for a load (i.e., means for judging a fluctuation in three-dimensional load), a pressing force-regulating means 34 (i.e., correction means) and a positioning means 35 for a rubbing roller (i.e., control means) in order to keep a constant three-dimensional load during the rubbing treatment. More specifically, based on a load signal outputted from the load-measuring means 32, the arithmetical unit 33 determines a deviation from a prescribed three-dimensional load to be imposed on the substrate by data with respect to relationships between a pressing depth and load components fz and fy, respectively. According to the deviation, the pressing force-controlling means 34 outputs a signal for correcting the pressing force to the positioning means 35, thus correcting the pressing force of the rubbing roller 10 to provide the prescribed three-dimensional load.

The above-mentioned rubbing apparatus as shown in FIG. 1 or 3 is usable for providing an alignment film with a uniform alignment control power.

The liquid crystal device to be treated or produced by the present invention may generally have a structure as shown in FIG. 4 explained hereinabove except that alignment control films 5a and 5b have been subjected to the rubbing treatment as described above. Further, the liquid crystal device may have a single alignment film (i.e., 5a or 5b in FIG. 4).

Hereinbelow, the present invention will be explained in detail with reference to Examples.

EXAMPLE 1

A 1.1 mm-thick glass substrate was provided, and transparent electrodes of ITO (indium tin oxide) were formed thereon, covered with a 600 Å-thick $SiO_2$ film as an insulating film for short circuit prevention by sputtering, and then coated with a polyimide forming liquid (1% solution in NMP of polyamide acid ("LQ 1800", mfd. by Hitachgi Kasei K.K.), followed by heat-curing at 300° C. for about 1 hour to form a 200 Å-thick polyimide alignment film.

Five transparent substrates were prepared in the above-described manner.

Separately, five rubbing rollers each comprising a cylindrical roller provided with a rubbing cloth having nylon pile yarn applied thereabout were prepared.

Each of the first transparent substrate and the first rubbing roller were disposed at a prescribed position of a rubbing apparatus shown in FIG. 1 and subjected to rubbing treatment in the following manner.

Referring to FIG. 1, a stage (reference numeral 31) was moved to a prescribed position under the first rubbing roller (10) and then the first rubbing roller was rotated (in the arrow B direction) and pressed against the first transparent substrate (1a or 1b), followed by rubbing treatment by moving the stage (31) in one direction (arrow A). Conditions for the rubbing treatment were determined at the prescribed position so as to provide a load component fz of 50 g/cm and a load component of fy of 25 g/cm.

Herein, the load components fz and fy were determined by dividing weight components (g) supported by a substrate in vertical direction and in horizontal direction, respectively, by a length (cm) of the substrate, being in contact with a rubbing roller, in a direction of extension (i.e., a direction perpendicular to the direction of movement).

Specific conditions for the rubbing treatment were as follows:

Pressing depth: 0.30 mm
(Roller diameter: 80 mm)
Rotational speed: 1000 rpm
Moving velocity: 30 mm/sec

Then, the second to fifth transparent substrates were successively rubbed by using the second to fifth rubbing rollers, respectively. At this time, values of az and fy were regulated so as to fall within a fluctuation of fz (Δfz) of ±1.5 g/cm and a fluctuation of fy (Δfy) of ±0.75 g/cm, respectively, per those imposed on the first transparent substrate (i.e., fz=50 g/cm, fy=25 g/cm).

The thus rubbing-treated five transparent substrates were subjected to measurement of a pretilt angle (degrees) (i.e., an angle of liquid crystal molecules at a substrate surface with respect to the substrate surface) in order to evaluate an alignment control power. The pretilt angle measurement was performed in the following manner by using 5 sample substrates prepared by cutting the center section but of 5 transparent substrates, respectively.

Measurement of pretilt angle α

The measurement was performed according to the crystal rotation method as described at Jpn. J. Appl. Phys. vol. 19 (1980), No. 10, Short Notes 2013.

More specifically, a pair of substrates rubbed in mutually parallel and opposite directions were applied to each other to form a cell having a cell gap of 20 μm, which was then filled with a liquid crystal mixture assuming SmA phase in the temperature range of 10°-55° C. obtained by mixing a ferroelectric liquid crystal ("CS-1014", mfd. by Chisso K.K.) with 20 wt. % of a compound represented by the following formula:

For measurement, the liquid crystal cell was rotated in a plane perpendicular to the pair of substrates and including the aligning treatment axis and, during the rotation, the cell was illuminated with a helium-neon laser beam having a polarization plane forming an angle of 45 degrees with respect to the rotation plane in a direction normal to the rotation plane, whereby the intensity of the transmitted light was measured by a photodiode from the opposite side through a polarizer having a transmission axis parallel to the polarization plane.

An angle $\phi_x$ between the incident beam direction and a normal to the cell for providing the central point of a family of hyperbolic curves in the interference figure thus obtained was substituted in the following equation to find a pretilt angle $\alpha_o$, $$\sin 2\alpha_o = \frac{-2\sin\phi_x}{(n_o + n_w)\sqrt{1 - (\sin\phi_x/n_o)^2}}$$

wherein $n_o$ denotes the refractive index of ordinary ray, and $n_e$ denotes the refractive index of extraodinary ray.

The results of the pretilt angle measurement are shown in Table 1.

TABLE 1

| Roller and substrate | 1st | 2nd | 3rd | 4th | 5th |
| --- | --- | --- | --- | --- | --- |
| Pretilt angle (deg.) | 16.4 | 16.7 | 16.6 | 16.0 | 16.4 |

As apparent from Table 1, the rubbing roller according to the present invention provided substantially constant pretilt angles, thus imparting a uniform alignment control power to the alignment film.

Comparative Example 1

Six (1st to 6th) transparent substrates and six (1st to 6th) rubbing rollers were prepared in the same manner as in Example 1.

The 1st to 3rd transparent substrates were successively rubbed by moving the stage in one direction by means of a conventional rubbing apparatus as shown in FIG. 5 having the 1st to 3rd rubbing rollers, respectively, on the following rubbing conditions:

Pressing depth*1: 0.30 mm (Roller diameter: 80 mm)
Rotational speed: 1000 rpm
Moving velocity: 30 mm/sec

*1: The pressing depth (0.30 mm) was set according to a visual measurement wherein a reference position at which the rubbing cloth of the rubbing roller substantially came contact with the transparent substrate throughout was determined by visual observation and then the rubbing roller was moved downward by 0.30 mm from the reference position by means of a dial gauge.

Separately, the 4th to 6th transparent substrates were successively rubbed by using the 4th to 6th rubbing roller, respectively, by moving the stage in one direction on the following rubbing conditions:

Pressing depth*2: 0.30 mm
(Roller diameter: 80 mm)
Rotational speed: 1000 rpm
Moving velocity: 30 mm/sec

*2: The pressing depth (0.30 mm) was determined by calculation on the basis of an average thickness of the rubbing cloth measured in advance and a radius of the rubbing roller.

The thus rubbing-treated six transparent substrates were subjected to measurement of a pretilt angle in the same manner as in Example 1.

The results are shown in the following Table 2.

TABLE 2

| Roller and substrate | 1st | 2nd | 3rd | 4th | 5th | 6th |
|---|---|---|---|---|---|---|
| Pertilt angle (deg.) | 16.0 | 18.1 | 15.4 | 17.5 | 17.2 | 18.9 |

As apparent from Table 2, the conventional rubbing apparatus provided large fluctuations in pretilt angle, thus failing to impart a uniform alignment control power to the alignment film.

EXAMPLE 2

In the same manner as in Example 1, 30 transparent substrates were prepared.

The transparent substrates were successively rubbed by using a rubbing apparatus shown in FIG. 3 having feedback control system described above. The rubbing treatment was performed by using one rubbing roller on the following initial conditions:

Pressing depth: 0.30 mm
(Roller diameter: 80 mm)
Rotational speed: 1000 rpm
Moving velocity: 30 mm/sec The thus rubbing-treated six transparent substrates (1st, 6th, 12th, 18th, 24th and 30th) were subjected to measurement of a pretilt angle in the same manner as in Example 1.

The results are shown in the following Table 3.

TABLE 3

| Roller and substrate | 1st | 6th | 12th | 18th | 24th | 30th |
|---|---|---|---|---|---|---|
| Pretilt angle (deg.) | 16.0 | 16.2 | 15.9 | 16.5 | 16.4 | 16.2 |

The measured values of pretilt angle were very stable and thus the rubbing apparatus having the feedback system according to the present invention imparted a uniform alignment control power to the alignment film.

Comparative Example 2

In the same manner as in Example 1, 30 transparent substrates were prepared.

The transparent substrates were successively rubbed in the same manner as in Example 2 except that a conventional rubbing apparatus as shown in FIG. 5 was used and a pressing depth was set according to the above-mentioned visual measurement used for the 1st to 3rd rubbing rollers in Comparative Example 1.

The thus rubbing-treated six transparent substrates (1st, 6th, 12th, 18th, 24th and 30th) were subjected to measurement of a pretilt angle in the same manner as in Example 1.

The results are shown in the following Table 4.

TABLE 4

| Roller and substrate | 1st | 6th | 12th | 18th | 24th | 30th |
|---|---|---|---|---|---|---|
| Pretilt angle (deg.) | 15.4 | 17.0 | 19.2 | 20.8 | 22.7 | 24.9 |

The measured values of pretilt angle were considerably changed and thus the conventional rubbing apparatus not having a feedback system failed to impart a uniform alignment control power to the alignment film.

What is claimed is:

1. A rubbing apparatus for imparting an alignment control power with respect to alignment of liquid crystal molecules to an alignment film on a transparent substrate of a liquid crystal device by rubbing the alignment film with a rubbing roller while the rubbing roller is rotated and kept in contact with the transparent substrate having thereon the alignment film, comprising:

measuring means for measuring a three-dimensional stress imposed on the transparent substrate by the rubbing roller when the rubbing roller is brought into contact with the transparent substrate, and control means for controlling said three-dimensional stress so as to provide a prescribed stress to effect a rubbing treatment.

2. A rubbing apparatus according to claim 1, wherein said measuring means performs the measurement of said three-dimensional stress by breaking up said three-dimensional stress into a stress component in a direction perpendicular to the face of the transparent substrate and a stress component in a direction parallel to the rubbing direction.

3. A rubbing apparatus according to claim 1 or 2, which further comprises:

judging means for judging a fluctuation in said three-dimensional stress, and correction means for correcting a fluctuation in said three-dimensional stress by controlling said control means based on a signal from said judging means to perform a correction of a fluctuation in said three-dimensional stress during the rubbing treatment.

4. An apparatus for producing a liquid crystal device of the type including a liquid crystal disposed between a pair of transparent substrates, at least one of the transparent substrates being provided with an alignment film, comprising:

load-measuring means for measuring a three-dimensional load corresponding to a three-dimensional stress imposed on the transparent substrate provided with the alignment film by a rubbing roller in the step of rubbing the alignment film with the rubbing roller while the rubbing roller is rotated and kept in contact with the alignment film thereby to impart an alignment control power with respect to alignment of liquid crystal molecules to the alignment film, and control means for controlling said three-dimensional stress so as to provide a prescribed three-dimensional load.

5. A process for producing a liquid crystal device of the type including a liquid crystal disposed between a pair of transparent substrates, at least one of the transparent substrates being provided with an alignment film, comprising:

measuring a three-dimensional lead corresponding to a three-dimensional stress imposed on the transparent substrate provided with the alignment film by a rubbing roller in the step of rubbing the alignment film with the rubbing roller while the rubbing roller is rotated and kept in contact with the alignment film thereby to impart an alignment control power with respect to alignment of liquid crystal molecules to the alignment film, and controlling said three-dimensional stress based on a measured three-dimensional load to impart a uniform alignment control power to the alignment film.

* * * * *

UNITED STATES PATENT AND TRADEMARK OFFICE
CERTIFICATE OF CORRECTION

PATENT NO. : 5,406,397
DATED : April 11, 1995
INVENTOR(S) : YASUTO KODERA, ET AL.

Page 1 of 2

It is certified that error appears in the above-identified patent and that said Letters Patent is hereby corrected as shown below:

ON TITLE PAGE

In [56] References Cited, under FOREIGN PATENT DOCUMENTS:

"3156424  7/1991  Japan
 5142542  6/1993  Japan"      should read

--3-156424  7/1991  Japan
  5-142542  6/1993  Japan--.

COLUMN 1

Line 35, "groups" should read --group--.
Line 56, "films." should read --film.--.

COLUMN 2

Line 20, "condition" should read --conditions--.
Line 48, "such a" should read --such an--.

COLUMN 3

Line 67, "cloth 11" should read --cloth 12--.
Line 68, "wounded" should read --wrapped--.

COLUMN 5

Line 18, "Hitachgi" should read --Hitachi--.

COLUMN 7

Line 5, "came" should read --came into--.

UNITED STATES PATENT AND TRADEMARK OFFICE
CERTIFICATE OF CORRECTION

PATENT NO. : 5,406,397
DATED : April 11, 1995
INVENTOR(S) : YASUTO KODERA, ET AL.

It is certified that error appears in the above-identified patent and that said Letters Patent is hereby corrected as shown below:

COLUMN 9

Line 4, "lead" should read --load--.

Signed and Sealed this

First Day of August, 1995

Attest:

BRUCE LEHMAN

Attesting Officer

Commissioner of Patents and Trademarks